No. 717,611. PATENTED JAN. 6, 1903.
L. E. PAINTER.
SHAVING MIRROR.
APPLICATION FILED NOV. 14, 1901.
NO MODEL.
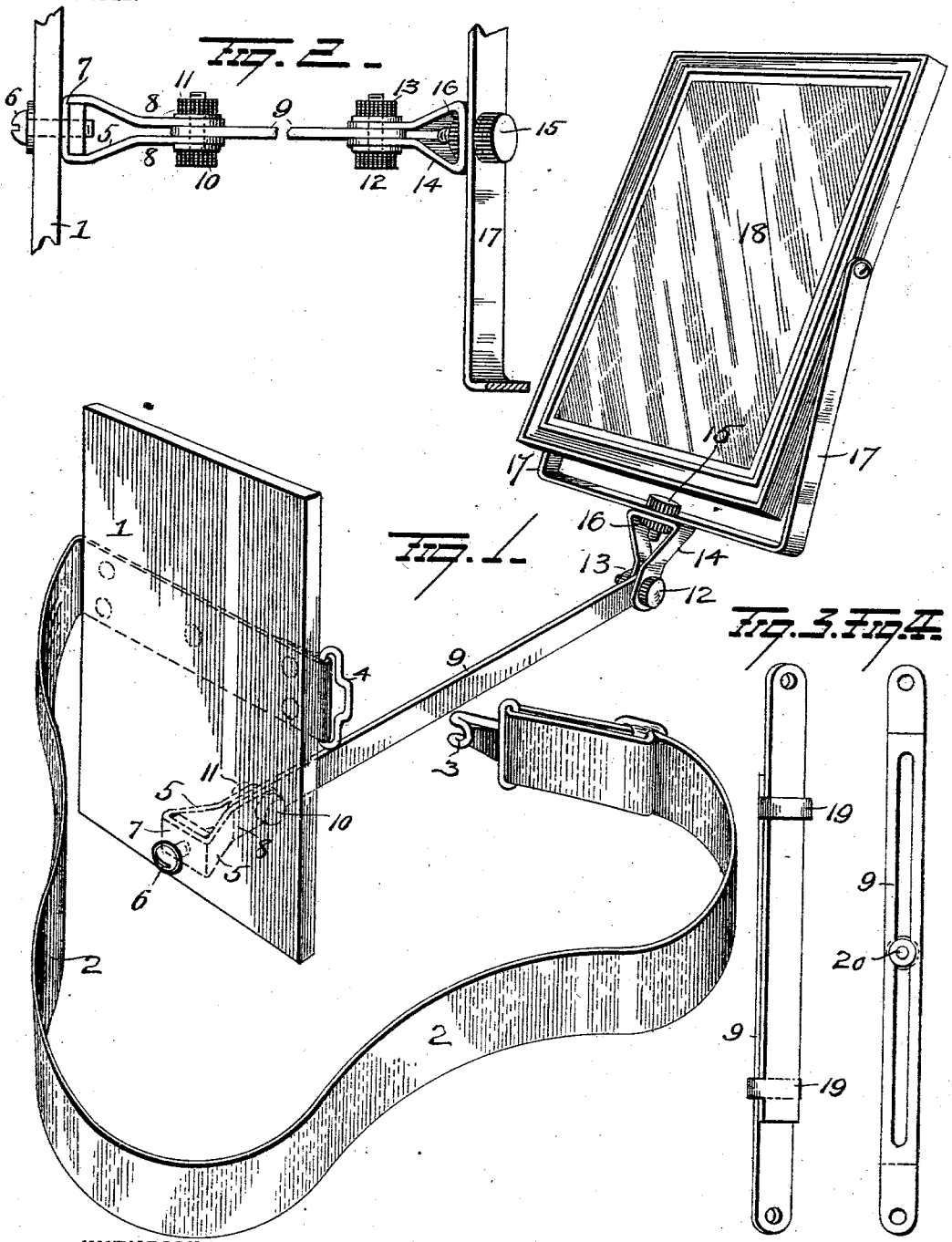
WITNESSES
INVENTOR
L. E. Painter
Attorney

UNITED STATES PATENT OFFICE.

LOUIS EDGAR PAINTER, OF LOUISVILLE, KENTUCKY.

SHAVING-MIRROR.

SPECIFICATION forming part of Letters Patent No. 717,611, dated January 6, 1903.

Application filed November 14, 1901. Serial No. 82,251. (No model.)

*To all whom it may concern:*

Be it known that I, LOUIS EDGAR PAINTER, a resident of Louisville, in the county of Jefferson and State of Kentucky, have invented certain new and useful Improvements in Shaving-Mirrors; and I do hereby declare the following to be a full, clear, and exact description of the invention, such as will enable others skilled in the art to which it appertains to make and use the same.

My invention relates to an improvement in shaving-mirrors, the object of the invention being to provide improvements of this character which can be attached to the body of the wearer and the position of the mirror readily adjusted to position to best suit the user.

With this object in view the invention consists in certain novel features of construction and combinations and arrangements of parts, as will be more fully hereinafter described, and pointed out in the claims.

In the accompanying drawings, Figure 1 is a perspective view illustrating my improvements. Fig. 2 is an enlarged view illustrating the bracket 5, and Figs. 3 and 4 are views illustrating modified forms of connecting-bar.

1 represents a block or plate, to which a strap or band 2 is secured and provided at one end with a hook 3 and at its other end with an eye 4 to secure the strap around the body of the user and securely hold the plate 1 against his breast, said strap being secured by a slide to enable it to be shortened or lengthened.

To the lower end of plate 1 a bracket 5 is secured by a screw 6 and nut, as shown. This bracket 5 comprises a strip of metal bent at two points between its ends, forming the flat base 7, secured to the plate 1. The respective ends of the strip then extend toward each other and are again bent, projecting outward and forming parallel arms 8 to receive between them a bar 9, said bar and both arms 8 being made with alined holes for a set-screw 10 and nut 11 to adjustably secure the bar at any angle desired. The outer end of the bar 9 is adjustably secured by set-screw 12 and nut 13 between the arms of a bracket 14, similar to bracket 5, the intermediate portion of which is secured by set-screw 15 and nut 16 to a U-shaped frame 17, in which a mirror 18 is hinged, as shown.

In operation the plate 1 is secured to the body of the user by strap 2, as above explained, and the bar 9 adjusted by means of set-screws 10 and 12 to dispose the mirror at just the proper height to enable the user to get a full view of his face. The frame 17 can, if desired, be swung on the set-screw 15 to change the angle of the mirror to suit the convenience of the user.

Instead of making the bar 9 of a single piece I might construct the same of two sections adjustably held together by bands 19, as shown in Fig. 3, to permit the length of the bar to be varied to dispose the mirror nearer to or farther from the user, as best suits him, or I might slot the sections and adjustably secure them together by a set-screw 20, as shown in Fig. 4.

While I have shown the set-screws and nuts as being rounded and roughened to facilitate their being readily turned, I might employ other forms of screws and nuts which would operate with equal effectiveness.

Various other slight changes might be resorted to in the general form and arrangement of the several parts described without departing from the spirit and scope of my invention, and hence I would have it understood that I do not wish to limit myself to the precise details set forth, but consider myself at liberty to make such slight changes and alterations as fairly fall within the spirit and scope of my invention.

Having fully described my invention, what I claim as new, and desire to secure by Letters Patent, is—

1. In a shaving-mirror, the combination with a plate to rest against the person of the user and means for securing said plate in place, of a bracket having a flat bearing against the outer face of said plate, a set-screw passing through the plate and bracket, a forwardly or outwardly projecting bar, a set-screw adjustably securing one end of the bar to said bracket, a bracket adjustably secured to the forward or outer end of said bar and projecting upwardly therefrom, said last-mentioned bracket having a seat at its upper end, a frame mounted upon said seat, a set-screw adjustably securing said frame in place, and a mirror mounted to swing in said frame.

2. In a shaving-mirror, the combination with a plate and a strap secured to the plate and adapted to secure the same to the body of the user, of a bracket secured to the plate and comprising a strip bent between its ends and the ends bent into parallel arms, a bar inserted between said arms, a set-screw passing through said arms and bar, a similar bracket adjustably secured to the outer end of the bar, a U-shaped frame on the last-mentioned bracket, a set-screw securing said frame and bracket together and a mirror hinged in said frame.

In testimony whereof I have signed this specification in the presence of two subscribing witnesses.

LOUIS EDGAR PAINTER.

Witnesses:
HARRY L. MEANS,
THOS. A. MCDONALD.